United States Patent [19]
Zinn

[11] Patent Number: 5,217,078
[45] Date of Patent: Jun. 8, 1993

[54] SOD STACKING MACHINE

[76] Inventor: Johannes Zinn, Box 45, Starbuck, Manitoba, Canada, R0G 2P0

[21] Appl. No.: 687,566

[22] Filed: Apr. 19, 1991

[51] Int. Cl.⁵ .................. A01B 45/04; B65G 57/24
[52] U.S. Cl. .................................. 172/19; 294/121; 414/789.7; 414/792.4; 414/792.6; 414/792.9
[58] Field of Search ................. 294/61, 81.6, 121; 414/789.7, 791.6, 792.9, 792.4, 792.6, 496, 531, 663; 172/19, 20

[56] References Cited

U.S. PATENT DOCUMENTS

| | | | |
|---|---|---|---|
| 3,243,056 | 3/1966 | Gagnon et al. | 414/792.6 X |
| 3,887,013 | 6/1975 | Helberg | 414/792.4 X |
| 3,935,904 | 2/1976 | Beck | 414/791.6 X |
| 4,294,316 | 10/1981 | Hedley et al. | 414/791.6 X |
| 4,604,018 | 8/1986 | Kruse | 414/792.9 X |
| 4,966,239 | 10/1990 | Hutchison | 414/789.7 X |

FOREIGN PATENT DOCUMENTS

40473 2/1915 Sweden .................. 294/121

Primary Examiner—Michael S. Huppert
Assistant Examiner—Janice Krizek
Attorney, Agent, or Firm—Adrian D. Battison; Stanley G. Ade; Murray E. Thrift

[57] ABSTRACT

A sod stacking machine includes a conveyor system for receiving sod pieces from a sod harvesting machine and aligning the pieces in rows. The sod pieces can be translated laterally from the conveyor to form a full layer for movement to a stack of the layers. The full layer is then grasped and lifted simultaneously for movement to the stack. The lifting is carried out by a planar lifting element which has a plurality of screw elements mounted thereon and which are rotatable in a screw direction and a release direction simultaneously by a chain drive system. Each screw element is surrounded by a compressing device for engaging the sod around the screw as it is screwed into place. The lifting device thus lifts all of the sod pieces simultaneously and transfers them to a pallet. The device can be used either with rolled sod pieces or folded slab sod pieces.

20 Claims, 8 Drawing Sheets

SOD STACKING MACHINE

This invention relates to a sod stacking machine of a type for use in association with a sod harvesting machine.

BACKGROUND OF THE INVENTION

Sod harvesting machines are generally mounted upon a tractor for movement across a field to be harvested. The sod harvesting machine includes a cutter blade which is guided by the machine to cut across the sod under the upper surface of the ground to a required depth and to a required width to form a continuous sod strip which is carried from the cutting blade on an inclined conveyor upwardly and rearwardly of the cutting blade for folding and collection.

A further cutting element adjacent the cutting knife is provided for severing the continuous sod length into separate sod pieces to enable them to be reasonably stacked and handled generally by manual process.

A first type of a machine known as a "slab machine" acts to simply fold the sod piece in two about a fold line transverse to the length of the sod piece at the mid point of the sod piece so that two lengths are folded to face inwardly.

In a second type of the machine, the sod pieces are rolled so that the forward edge of the sod piece starts the inside of the roll and then as the sod piece is forwarded along the conveyor the roll is continued at a fixed location along the length of the conveyor until the trailing edge reaches the roll whereupon the roll is released to be stacked in roll form.

It is of course necessary to properly handle and stack the sod pieces as they are released from the conveyor. Up till now the stacking of the sod pieces has been carried out wholly by hand. For this purpose the tractor carries at the rear of harvesting conveyor a pallet support system for receiving a pallet onto which the sod pieces can be stacked. Alongside the pallet is arranged a platform on which the labourer stands. The labourer is then required to grasp each sod piece as it is presented by the harvesting machine and to manually lift that sod piece and transfer it onto the pallet. Slabs are of course laid side by side across the pallet. In most examples a slab for manual handling is preferably 48 inches by 24 inches so that when folded it is 24 inches by 24 inches thus constituting one quarter of the surface of a four foot square pallet. Smaller slabs are possible and often 16 inch wide harvesting machines are used so that in this case three such slabs are arranged across the width of the pallet. When stacking rolls, the rolls are arranged in a row in a first direction across the pallet and then the direction is rotated through 90° for a second row of rolls thus forming a stable stack. Again twenty four inch rolls are possible in which case two rolls side by side fill the width of the pallet. Sixteen inch rolls require three such rows to fill the width of the pallet.

However as stated above up till now this stacking process has been carried out wholly manually which is a very tiring and unpleasant task bearing in mind that the sod pieces can be very dusty and bearing in mind that as much as fifty tons can be harvested in a single day. However up till now the complexity of handling the sod pieces has required the manual dexterity of a human labourer to grasp and handle the different type of sod pieces without allowing the structure of the slab or roll to become deformed and to enable a proper stack to be formed.

SUMMARY OF THE INVENTION

It is one object of the present invention, therefore, to provide a stacking machine for stacking sod pieces from a sod harvesting machine which obviates the necessity for manual labour.

According to the invention, therefore, there is provided a machine for use in association with a sod harvest machine for stacking sod pieces comprising conveyor means for receiving the sod pieces sequentially from the harvesting machine, means for aligning the sod pieces in at least one row including a generally horizontal support surface means for supporting the sod pieces in said row and means for lifting sod pieces of the row simultaneously vertically from the support surface and for translating the sod pieces from the support surface laterally for deposit on a stack of the rows of sod pieces.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

The sod stacking machine is used in conjunction with a conventional sod harvesting machine. Various designs of sod harvesting machine are currently available and therefore the parts of this machine are not shown in detail in the attached drawings and will not be described in detail as these will be apparent to one skilled in the art. However to place the present invention in context some of the parts are shown schematically and will be described as follows.

Figure 1:
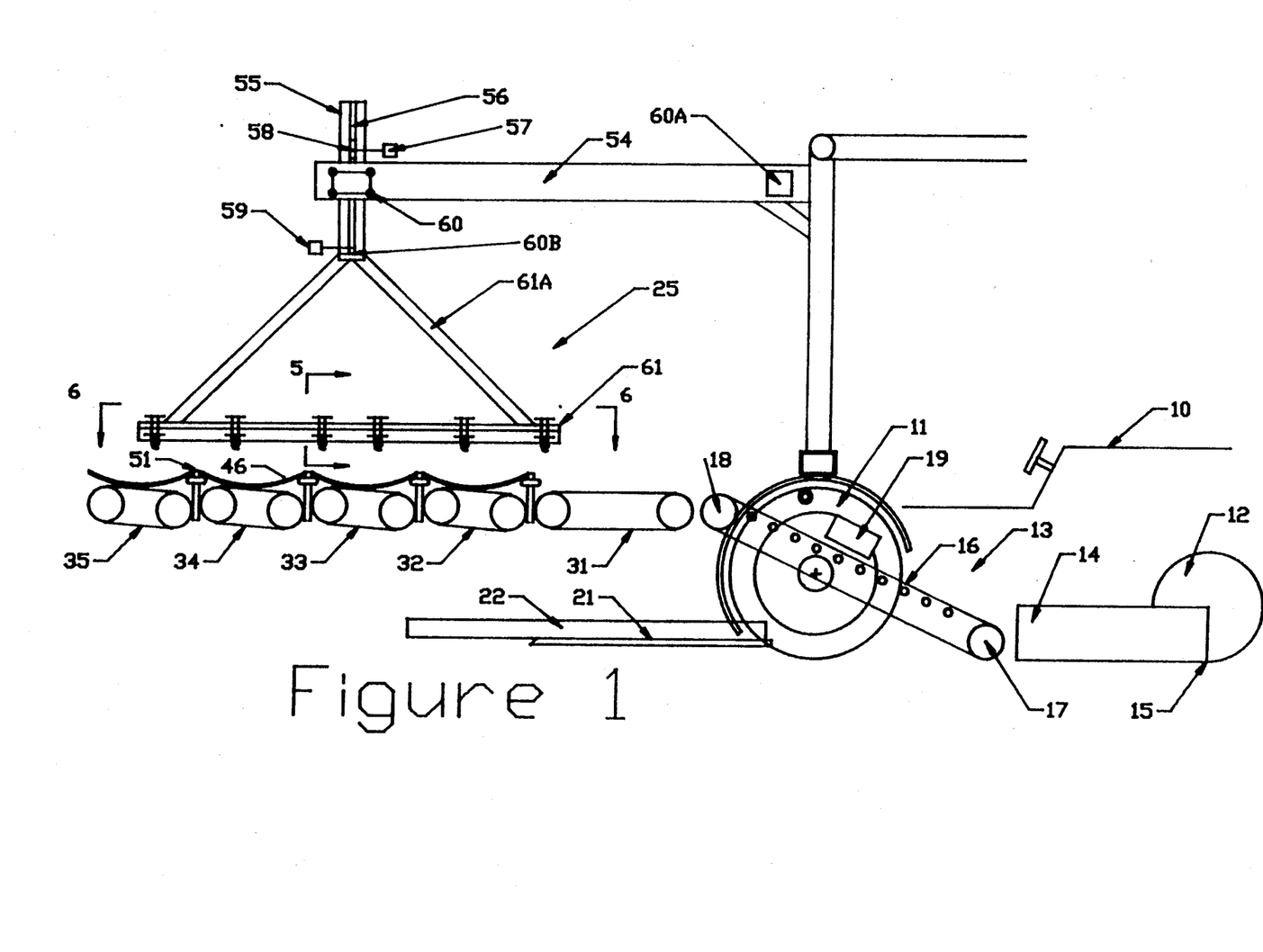
FIG. 1 is a schematic side elevational view of a sod harvesting machine incorporating the stacking machine according to the present invention.
Figure 7:
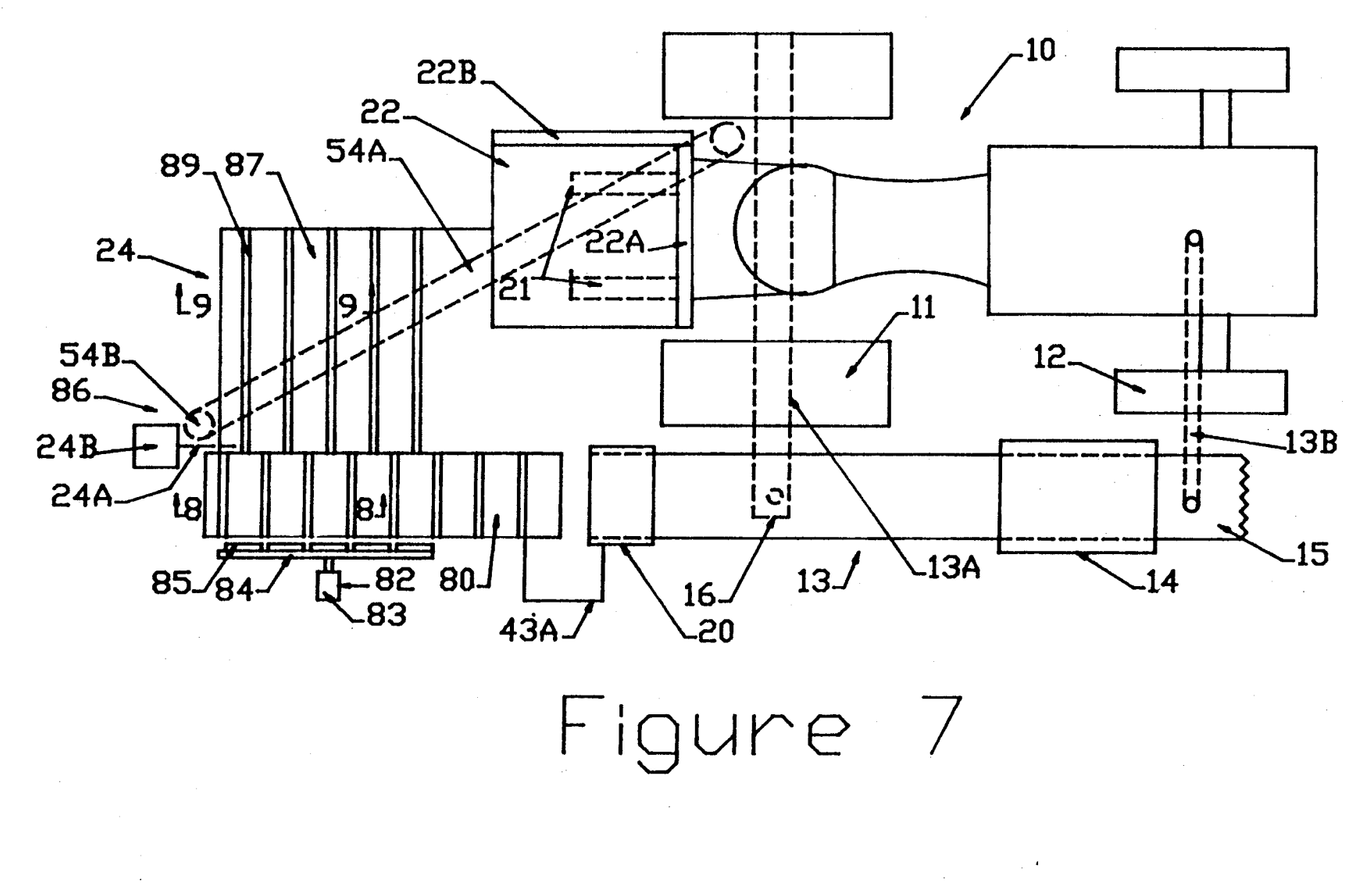
FIG. 7 is a top plan view of the harvesting machine showing a slightly modified arrangement for use in stacking rolled sod pieces.

In FIGS. 1 and 7 some parts of the sod harvester are shown as including a tractor generally indicated at 10 including rear wheels 11 and front wheel 12. On one side of the tractor is mounted the sod harvesting machine generally indicated at 13 which is coupled to the tractor by a main transverse beam indicated schematically at 13A and a front stabilizer 13B. The sod harvesting machine includes a front section 14 shown only schematically which includes a cutting blade 15 for cutting under the required upper layer of sod to a required variable depth and to a required width. Generally the sod harvester includes within the front section 14 a control system which measures and maintains the required depth and which guides the tractor to maintain the required width. The width is generally set at either 24 inches or 16 inches depending upon the requirements of the farmer and this width dictates the width of the required conveyor belts which transfer the sod once cut.

The sod harvester further includes a conveyor 16 which takes the continuous sod strip in the required width from the rear of the front cutting section 14 upwardly and rearwardly to the rear of the tractor. The conveyor 16 includes a lower sprocket 17 and an upper sprocket 18 over which the endless belt defined in the conveyor runs to carry the sod. The belts used for the conveyor are generally of the mesh type formed from interconnecting metal strips since this type allows any excess soil or loose particles to fall through the mess to return to the ground without collection in the system.

In FIG. 1 is shown a slab forming system schematically indicated at 19 which is positioned partway along the conveyor 16. The slab forming system comprises a folding device which grasps the front edge of the length of sod piece and holds that front edge while the sod piece continues along the conveyor until the front and rear edges overlie and then drops the front edge onto the rear edge to form a folded slab. The cutting mechanism 14 also includes a length cutting mechanism which measures the length of the continuous sod strip and then cuts vertically downwardly into the sod strip to form separate lengths.

The folded slab or sod piece then continues along the conveyor 16 to the upper conveyor sprocket 18 at which the slab is presented for stacking.

In the arrangement shown in FIG. 7, a sod rolling device is provided and this is indicated schematically at 20 and is mounted at the upper end of the conveyor 16 and is operable to grasp the leading end of the sod piece and to turn that leading edge over to form a roll which is then continued as the remainder of the sod pieces carried along the conveyor 16 thus forming a roll at the rolling device 20. When completed the roll is allowed to exit from the rolling device and is again thus presented at the upper end of the conveyor 16 for stacking. The folding device and the rolling device thus act as turning means for turning one end of each sod piece back over onto a part of the same sod piece to form a sod piece having at least two superposed portions.

The tractor carries a pair of pallet forks 21 which project rearwardly from the tractor in between and rearwardly of the rear wheels 11. On top of the pallet forks is carried a pallet 22 onto which the sod is to be stacked. In the conventional manual operation, the labourer stands upon a platform (not shown) and manually lifts each sod piece from its presentation position adjacent the sprocket 18 and places the sod piece manually onto the pallet and subsequently of course onto already stacked sod pieces. The pallet is confined by a front wall 22A and a side wall 22B, the latter acting as a support for a stack of subsequent pallets. When the pallet is fully stacked up to a height of the order of five to six feet, the machine is temporarily halted and the pallet forks tilted to deposit the loaded pallet into the field for later collection. A fresh pallet is then placed upon the pallet forks and the machine is restarted to continue the sod cutting, forming and stacking process. Improperly formed sod pieces can be discarded by the labourer and these are simply discarded onto the ground for later collection. In an alternative arrangement for stacking (not shown) the pallet 22 and pallet forks can be replaced by a pallet-less system in which the sod pieces are directly stacked onto a plurality of forks which are then removed from the underside of the stack when the stack is complete but leaving spaces in places where the forks were previously located so that the stack can be relifted by a fork lift device having identical forks on which the stack has been formed. The present invention is applicable either to a pallet system or to a pallet-less system.

In a conventional stacking of slabs, the labourer manually grasps each slab and places it across the pallet and then places a second slab along side the first slab. After a certain number of rows are placed on the pallet in this manner, the labourer will generally place a row in the opposite direction to link the stack more effectively. In the roll stacking system, the rolls are arranged in a first row with the axis of each roll parallel in two or three rows depending upon the width of the roll. The next row is then laid with the axis parallel but at 90° to the axis of the first row thus forming a stable stack.

A first embodiment of the stacking machine according to the present invention is shown in FIGS. 1 through 6 which is particularly applicable to the stacking of slabs. In this case it is intended that the machine operate with slabs formed from sod pieces which are 96 inches in length so that when folded about a mid point the slabs have a length of 48 inches thus directly filling one side edge of a 4 foot pallet.

Generally the machine comprises a first conveyor element 23, a translation or row forming system generally indicated at 24 and a lifting system generally indicated at 25.

The conveyor system 23 and the row forming system 24 are mounted upon a frame 26 including a cross rear beam 27 and a plurality of rearwardly extending beams 28, 29 and 30. The rear beam 27 is mounted upon castor wheels 27A so that the rear edge of the frame is carried by the castor wheels for running across the ground and supporting the device at a required location rearwardly of the tractor. The front ends of the beams 28 and 29 are connected to a transverse beam (not shown). The transverse beam is located adjacent the beam 29 and is connected to the beam 28 by an angled connector to avoid the rear wheel of the tractor. A stabilizer 30A is releasably connected between the beam 30 and the side wall 22B of the palletsupport. The frame thus is pivotally coupled to the tractor in a manner which defines a horizontal transverse pivot axis allowing the rear beam 27 to move upwardly and downwardly but maintaining that beam parallel to the rear of the tractor. Any steering action necessary therefore occurs by castoring of the wheel 27A.

Figure 2:
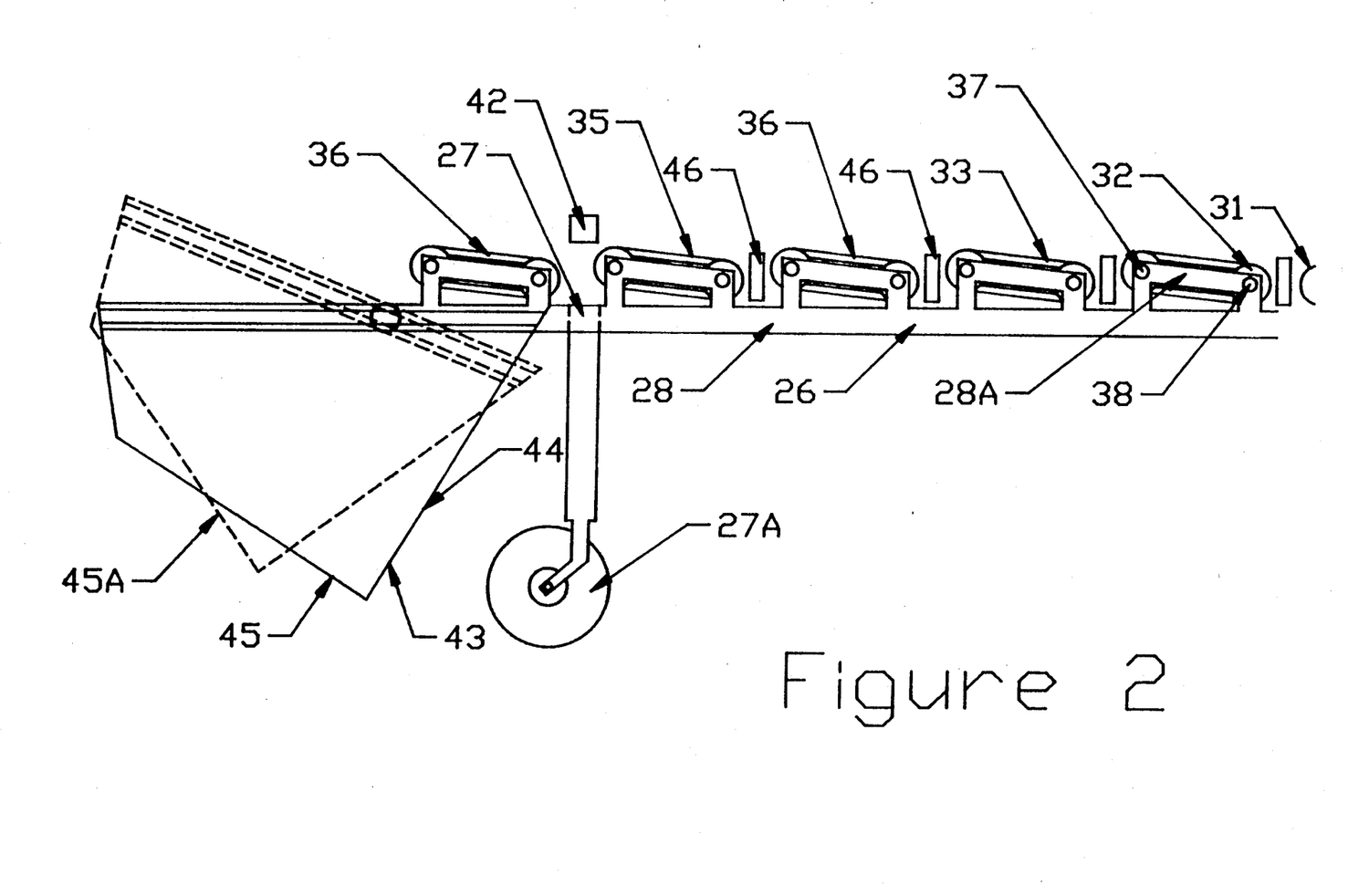
FIG. 2 is a similar side elevational view showing a part only of the stacking machine and showing that part in more detail.

The beams 28 and 29 support the conveyor arrangement 23 which is defined by six separate conveyor elements 31, 32, 33, 34, 35 and 36 arranged sequentially downstream from the conveyor 16. For convenience of illustration the last conveyor 36 is omitted from FIGS. 1 and 3 but is shown in FIG. 2. Each of the conveyors comprises a frame portion 28A which stands up from the main beam 28 and a similar frame portion provided on the beam 29 but not shown. Each frame portion has a length equal to the length of the conveyor. Each frame portion carries a pair of bearings 37 and 38 supporting transverse shafts 39 and 40. Each shaft carries a pair of sprockets 41 shown in the cutaway portion of FIG. 3 with each sprocket forming a cylindrical drum on which the conveyor belt runs together with projecting teeth which engage into the spaces between the metal strips of the conveyor belt for driving an endless loop into the conveyor. All of the conveyor belts are formed of the previously mentioned metal mesh material which has perforations to allow material which is loose to fall through. As best shown in FIG. 2 the discharge roller of each conveyor is arranged at a height above the feed in roller of each conveyor element so that the sod piece tends to curve downwardly as it is discharged encounters the feed in roller of the next adjacent conveyor belt arrangement so that the sod piece is then carried along the full length of the conveyor belt elements.

As best shown in FIG. 2, the full length of the conveyor belt elements 32, 33, 34 and 35 together is equal to the length of a slab that is 48 inches. Due to the folding of the slabs as previously described, there is a space between each slab and the next equal to the length of the slab but is approximately 48 inches and thus when the slab lies across the conveyor elements 32, 33, 34 and 35 it can be halted without intefering with the movement of the next slab which is just about to enter onto the conveyor 31. The leading edge of the slab is detected by a sensor 42 which acts then to halt the forward movement of the conveyor elements 32, 33, 34 and 35 thus stopping the slab at that location.

In the event that the slab is detected or observed to be unsatisfactory, it can be discharged by operating the conveyor elements to forward the slab onto the conveyor element 36 which allows it to be discharged into a bin 43 which can store all of the discharged or scrap slabs. The bin 43 includes a back wall 44 and a hollow container portion 45 which can be pivoted into an open position shown in dotted line at 45A which allows the material collected in the bin to slide down the back wall 43 and to be discharged onto the ground. This discharge will normally occur at the time of unloading a pallet so that the subsequent cleaning of the field after harvesting of the sod strip can be carried out simply by moving to each discharge site and picking up the pallets and the discarded scrap materials.

In the event that the slab halted on the conveyor elements is satisfactory, it is moved from the conveyor elements into the row forming section 24 by translational movement from the conveyor element in a direction at right angles thereto. This movement is carried out by four as shown, but more if required conveyor chain devices 46 which are arranged in parallel spaced location. Each conveyor chain arrangement includes a pair of sprockets for driving the chain longitudinally of the length of an upper run of the chain so as to transport the slab in the required direction. As shown best in FIG. 4, the sprockets include a front sprocket 47, a rear sprocket 48 and intermediate sprocket 49. Each of the sprockets is mounted upon a lever 50 pivotally mounted upon a suitable support extending transversely of the main longitudinal beams 28, 29 and 30. In the position of the conveyor element 46 shown in full line in FIG. 4, the upper run of the chain lies beneath the upper run of the conveyor element so that the slab can be moved longitudinally of the conveyor element without interference from the chain. By pivotal movement of each of the levers 50 about the supporting frame element to a position shown in dotted line, the upper run of the chain is lifted to a position above the upper surface of the conveyor element so that the slab previously supported by the conveyor elements is lifted away from the conveyor elements and is supported wholly upon the four chains. Thus as shown in FIG. 2 each chain arrangement is located between one of the conveyor elements and the next adjacent conveyor element in a relatively narrow area therebetween.

Figure 3:
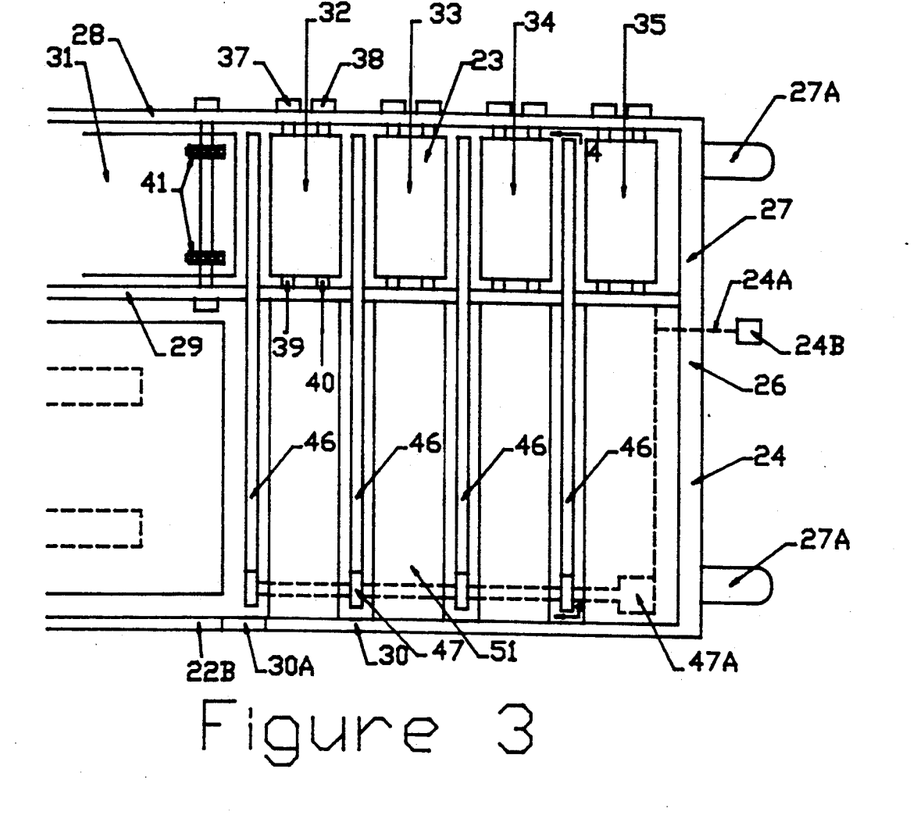
FIG. 3 is a top plan view of the harvesting machine of FIG. 1 showing the conveyor and lateral movement system.
Figure 4:
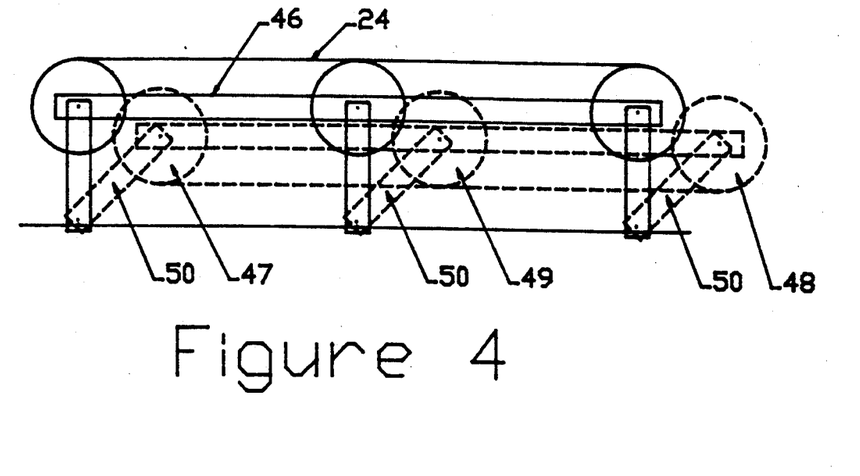
FIG. 4 is a view along the lines 4—4 of FIG. 3.

In the area of the row forming section 24 between each chain element and the next adjacent chain element 46 is provided a curved support surface 51 so that the slab when transported from the conveyor element 23 onto the row forming section is supported by a surface defined by the curved support surfaces 51 and the chains 46. As shown in FIG. 3 the sprockets 47 of the chain elements are driven by a motor 47A mounted on the frame.

The row forming section 24 can therefore receive two 24 inch side by side slabs moved forwardly from the conveyor section. When used with a 16 inch machine, three slabs on the section 24 together provide a total width equal to the four foot dimension of the pallet with a length of the slabs equal to the length of the pallet. These three slabs therefore form a single row for application to the pallet by the lifting system 25.

Figure 5:
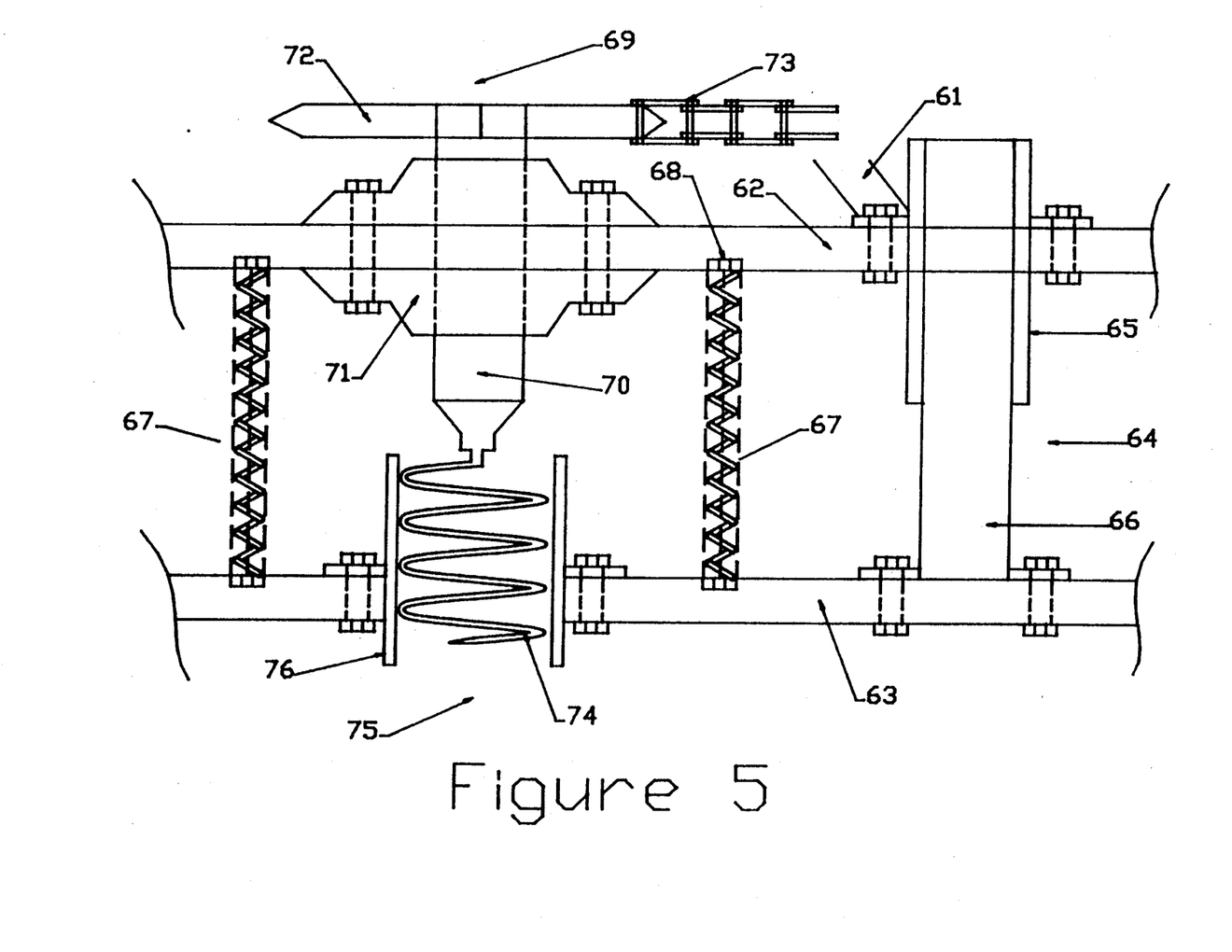
FIG. 5 is a cross-sectional view along the lines 5—5 of FIG. 1 on an enlarged scale showing the detail of the sod lifting elements.
Figure 6:
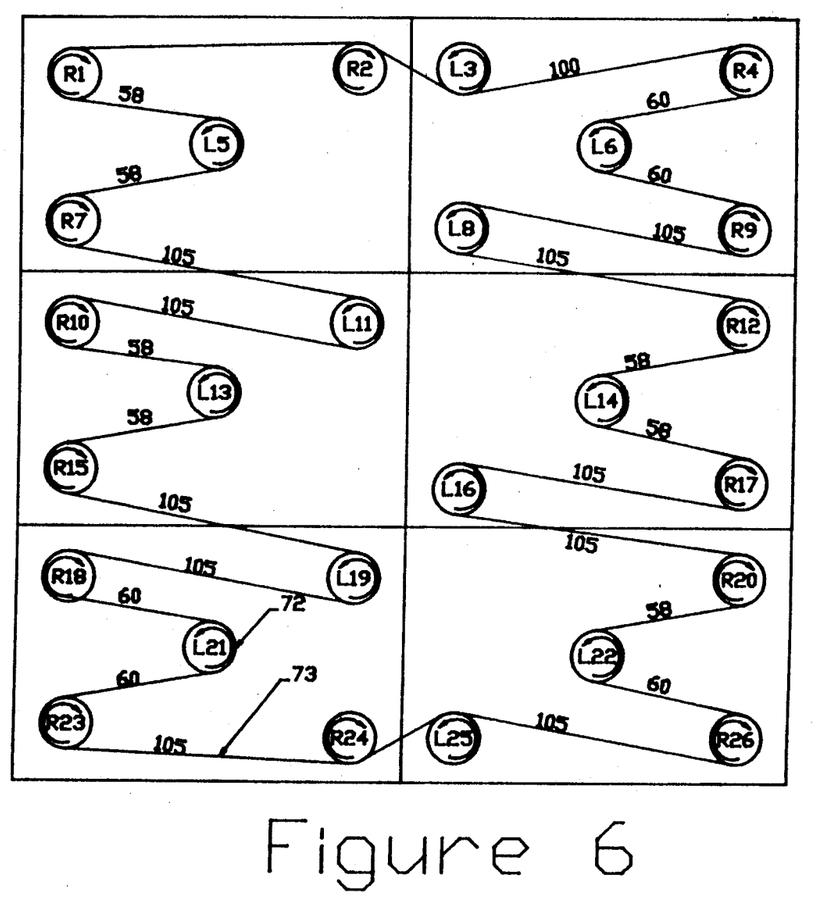
FIG. 6 is a top plan view of the lifting system taken along the lines 6—6 of FIG. 1.

The lifting system is shown in FIGS. 5 and 6 with a frame for the lifting system being shown in FIG. 1. The frame comprises a boom 54 mounted on the tractor and extending rearwardly therefrom. The boom carries a vertical arm 55 which can be moved vertically upwardly and downwardly by a chain drive system 56 including a hydraulic motor 57 and a sprocket 58 which acts upon the chain 56 which is carried on the vertical post 55. A lower end of the post 55 can also be rotated about a vertical longitudinal axis by a rotary drive system schematically indicated at 59. The post also slides longitudinally along the boom upon a carriage 60 defined by a plurality of wheels which can roll along flanges defined on the boom. A chain drive system 60A propels the carriage in its movement. The post is then retained vertical as it moves in the longitudinal, vertical and rotational directions. At the bottom of the post is mounted a support element in the form of a planar body 61 supported at the lower end of the post on trusses 61A. The trusses are connected to the post on a pivot 61B which allows limited pivotal movement of the planar body 61 about a single pivot point. The support element is shown in more detail in FIGS. 5 and 6 and comprises an upper plate 62 and a lower plate 63 both of which are substantially planar and are arranged in horizontal parallel spaced relationship. The upper plate 62 is rigidly coupled to the trusses 61 so as to be maintained in fixed horizontal position at right angles to the post 55. The plate 63 can move relative to the plate 62 vertically so as to increase and decrease the distance therebetween. The movement of the plate 63 is guided by guide elements generally indicated at 64 and provided by a sleeve 65 mounted upon the plate 62 and a pin 66 slidable within the sleeve and attached to the plate 63. Springs 67 bias the plates apart to a maximum distance limited by bolts 68 passing through the centre of the coil spring 67. Thus the spacing is maintained at a maximum by the spring bias but can be reduced by a sliding action thus allowing the plate 63 to rise relative to the plate 62.

The lifting element includes a plurality of separate screw elements generally indicated at 69. Each screw element comprises a shaft 70 mounted in bearings 71 carried on the plate 62. The shaft 70 can thus rotate about a vertical axis driven by a sprocket 72 connected to a chain 73. Each shaft 70 carries at its lower end a corkscrew member 74 with a pointed end 75 for engaging into the upper surface of an underlying portion of a slab and a plurality of screw turns for engaging into the body of a slab. Around the screw element 74 is provided a sleeve 76 carried upon the plate 63. The sleeve thus closely surrounds the screw element and normally ends at a position at or just below the pointed end 75 so as to engage the surface of the slab at or just before the time of engagement of the screw member 74 with the slab.

In the lifting operation, therefore, the lifting element is moved downwardly into contact with the upper surface of the sod pieces. The sleeves 76 engage the sod pieces and act as guides to ensure that the screw element 74 moves vertically downwardly into engagement with the body of the sod piece to grasp the sod piece. All the sod pieces of the row can thus be lifted simultaneously while the screw elements remain in the body of the sod piece and carried to the pallet. The lifting element is then moved downwardly again into contact with the pallet following which the sprockets 72 are driven in reverse direction to release the screw elements from the body of the sod piece while the sod piece is again held down by engagement with the sleeves 76.

As shown in FIG. 6, the array of screw elements is shown for simultaneously lifting two such slabs of 24 inches or three slabs of 16 inches as defined by the dotted lines. Each slab is therefore engaged by two rows of four lifting elements so that each slab is properly grasped and lifted without danger of the edges bending down and the slab becoming distorted from its proper flat shape. The length of the screw element is such that it engages both surfaces of the slab sufficiently to hold both surfaces of the slab against the plate 63. The chain 73 extends around all of the sprockets 72 in a manner which allows the sprockets simultaneously driven in a first direction to drive the screw elements into the slabs and in the second direction to release the screw elements.

The above described slab machine can be used with relatively long slabs of 48 inches or with shorter slabs as desired since in each case the slabs are collected, move transversely to form the necessary rows and then simultaneously lifted to be transported to the pallet. In most cases the rows are simply placed one on the next and occasionally a row is rotated through 90° by rotation of the vertical post so as to deposit one row at 90° to the rest of the rows to better bind the rows and to prevent toppling of the stack.

In FIGS. 7, 8, 9 and 10 is shown an arrangement which is very similar to that described above but which is modified for use with sod in roll form. In this embodiment the sod rolls are formed by the former 20 and are discharged from the former 20 one at a time by a distance spaced substantially equal to the length of each sod piece.

Figures 8, 9:
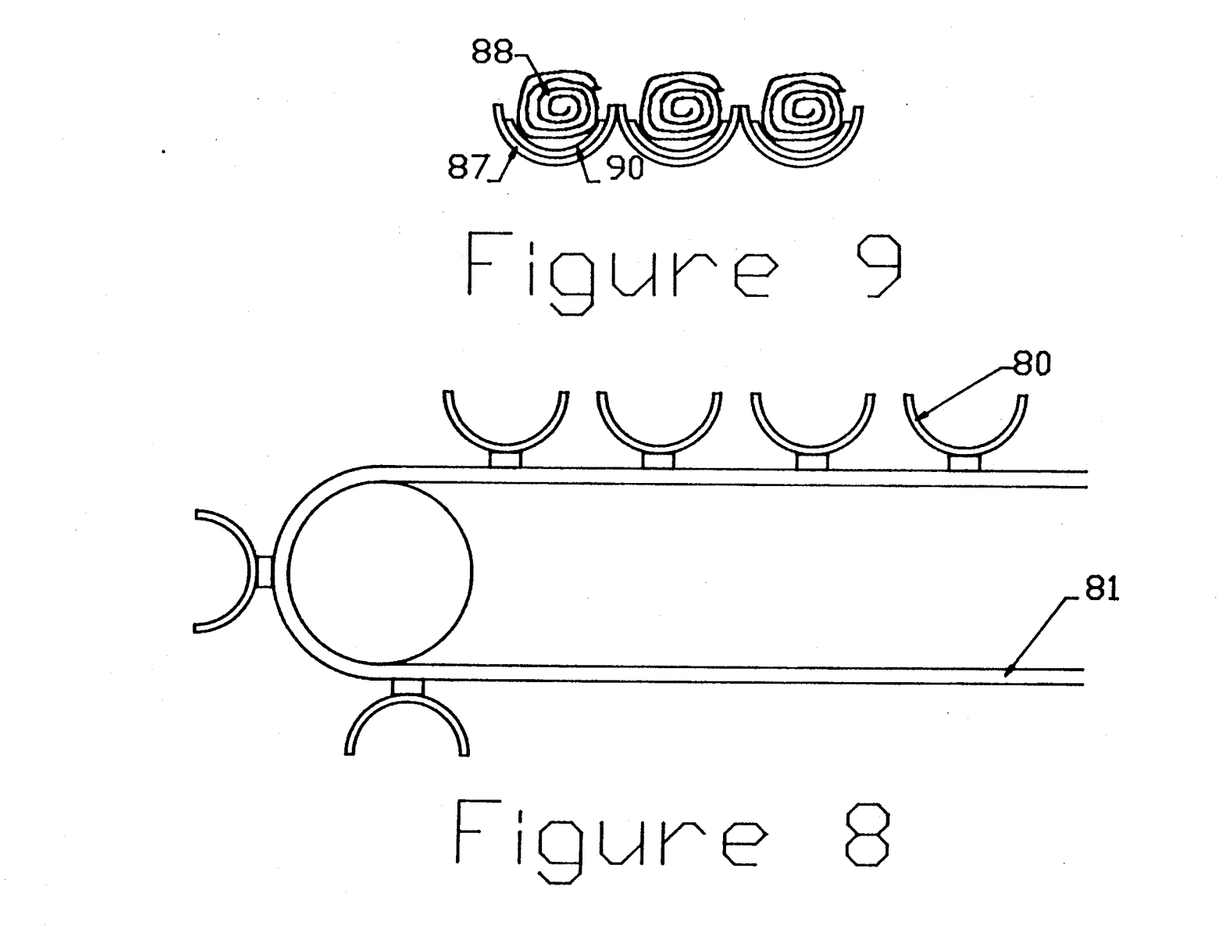
FIG. 8 is a view along the lines 8—8 of FIG. 7 showing the conveyor receptacles.
FIG. 9 is a view along the lines 9—9 of FIG. 7 showing the fixed receptacles.

In place of the conveyor elements previously described, a single conveyor element is provided as shown in FIGS. 7 and 8 and is of a type including a plurality of semi cylindrical cups or receptacles 80 mounted upon an endless conveyor 81. Each receptacle thus will receive a single sod roll. The conveyor element 81 is located and operated so that each roll as it is discharged from the roll former is properly dropped into a cup or receptacle in a required orientation, preferably with the last part of the roll across the upper part of the roll as best shown in FIG. 9. As each sod roll is deposited into a receptacle, the receptacle is moved rearwardly away from the roll former so as to present the next receptacle for the next sod roll. A scrap collection box 43A is provided alongside the first receptacle to receive scrap pieces if a discharge device (not shown) is actuated by the operator.

As shown in FIG. 7, the conveyor element 81 is of a length to provide approximately eight such receptacles across the upper run of the conveyor. The receptacles at the last five positions spaced from the roll former are aligned with a roll pusher system generally indicated at 82. The roll pusher 82 includes a cylinder 83 which can push forwardly a frame 84 carrying a plurality of plates 85 movable longitudinally of the rolls in a direction parallel to the axis of the rolls with all of the axes lying parallel and transverse to the conveyor. Thus when all five receptacles are properly filled, the pusher 82 can be operated to move the rolls transversely onto a fixed support generally indicated at 86. The fixed support is shown in FIG. 9 and includes a plurality of semi cylindrical fixed surface receptacles 87 into which the rolls are pushed as indicated at 88. To assist in moving the rolls along the fixed receptacles or channels 87 there can be provided either as shown in FIG. 7 a chain system 89 in the bottom of the fixed receptacle or more preferably a belt system 90 which runs over the upper surface of the receptacle. The belt system can be of the type used in belt conveyors which include a belt running through the inside of a channel thus confining the belt and curving the belt to follow the upper surface of the fixed receptacle while providing a forwarding force on the roll tending to move it longitudinally of the receptacle. This type of transportation system also allows any collected mud or soil to discharge from the belt at the end of the channel where the belt changes shape.

When used with the 24 inch machine, when two sets of rolls are moved end to end onto the fixed receptacles the rolls can be lifted simultaneously by operation of the lifting system substantially as previously described. The complete row for the stack is therefore lifted simultaneously and moved onto the pallet as best shown in FIG. 7. In this case the boom indicated at 54A is mounted partly on the tractor and partly on a post 54B carried at the rear of the frame of the sod stacking machine. This double support rather than the cantilever support previously described enables the boom to carry sufficient weight constituted by the greater amount of sod to be lifted in the roll forming system. As shown the boom is arranged substantially diagonally so that it passes across the centre of the square defined by the collected rolls and across the centre of the pallet without the necessity for translational movement. Rotational movement is however necessary in order to rotate each row through 90° to alternate the rows for formation of a proper stack. The machine shown in FIG. 7 can also be used for a 16 inch width cut and hence the fixed receptacles 87 receive three rolls end to end which are pushed longitudinally of the fixed receptacles so that the three sets of rolls are simultaneously lifted and transferred to the pallet.

Figure 10:
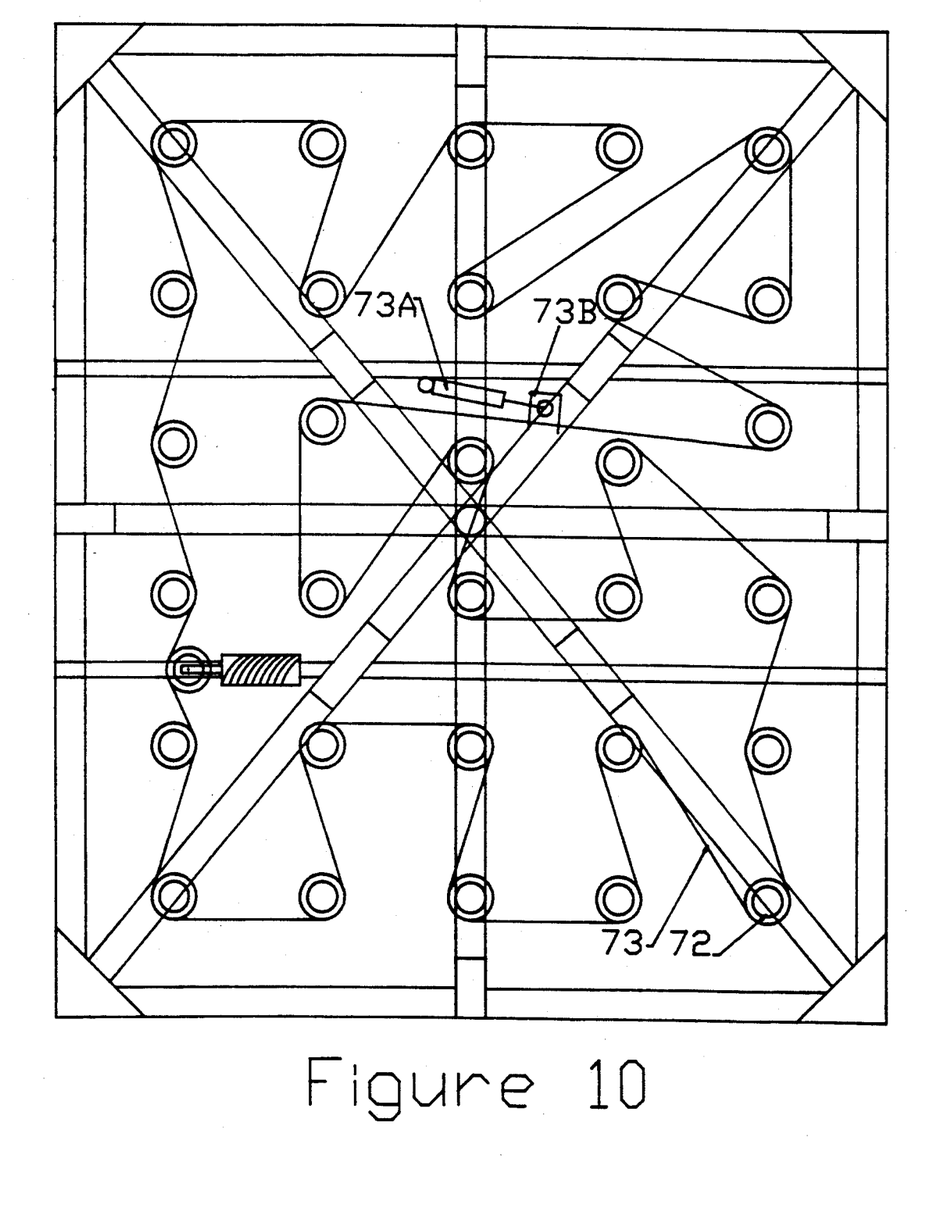
FIG. 10 is a top plan view similar to that of FIG. 6 showing the arrangement of lifting elements for the roll type stacking machine of FIG. 7.

The array of sprockets 72 for lifting the rolls is shown in FIG. 10. In this case the sprockets of the screw element are arranged in five rows each for picking up one roll. In each row is provided six lifting elements so that when 24 inch rolls are to be lifted three such elements lift each roll. When 16 inch rolls are to be lifted two such elements lift each roll. The chain 73 in this embodiment is moved longitudinally by a cylinder 73A which operates to drive a lug 73B attached to the chain in a direction longitudinally of a portion of the chain. This movement of the lug causes the whole chain to move to provide rotation of the screw elements in a clockwise engagement direction and a counterclockwise release direction.

To assist the screw elements in grasping the rolled sod pieces, the lower end of the sleeve 76 surrounding each screw element can have a part cylindrical surface attached thereto so as to wrap around the upper part of the sod roll to press the sod roll downwardly as it is engaged by the rotating screw member.

When it is required to discharge the pallet after stacking of the pallet to a required height, firstly the lifting element 61 is moved to a position above the pallet so that it is away from the row receiving section. The row receiving section is then pivoted upwardly about a pivot coupling adjacent the conveyor so that it is moved out of the way of the pallet allowing the pallet to be discharged rearwardly. This construction is shown only schematically as it is not essential to the operation of the machine and since a suitable design will be well apparent to one skilled in the art. In FIGS. 3 and 7, the pivot axis is indicated schematically at 24A and a lifting device is indicated at 24B which is shown only schematically and will be apparent to one skilled in the art. The height of the boom in both cases is selected so that it is sufficient to allow the pivotal movement of the row forming section 24 to a height to clear the pallet.

The device can further include a pallet loading system (not shown) positioned outside of the wall 22B for moving a fresh pallet into place when the filled pallet is discharged thus avoiding the necessity for the operator to step out of the air conditioned cab.

Furthermore there may be provided (not shown) a binder system for dispensing a binder fabric over a row on a periodic basis so as to ensure that the stack is properly bound together. In the conventional manual process, often the labourer will lay an unrolled sod piece over the stack as a binder. In the automatic stacking system this is not possible but can be overcome by the provision of a fabric dispensing system of a mesh type which simply lies across a stacked row.

Although described above in relation to a 48 inch pallet, some machines use a 36 inch pallet with an 18 inch sod width. It will of course be appreciated that the machine shown can be modified to accomodate such dimensions.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A sod harvesting and stacking machine comprising
a vehicle frame having ground wheels for movement across ground to be harvested of sod;
a sod cutting element mounted on the vehicle frame for movement therewith and arranged to cut from the ground only a single width of sod of substantially continuous length;
sod transporting means for moving the single width of sod upwardly with respect to the ground and rearwardly of the vehicle frame;
cutting means for cutting the sod width transversely at spaced positions longitudinally of the harvested sod length into a plurality of sod pieces arranged end to end;
turning means for turning one end of each sod piece back over onto a part of the same sod piece to form a sod piece having at least two superposed portions;
a pallet support for supporting a pallet for receiving the sod pieces stacked thereon in a plurality of layers each layer being placed on top of a preceding layer;
means for forming the sod pieces into a layer for transfer to the pallet including means for discharging defective sod pieces, conveyor means having a horizontal portion for transporting remaining pieces in a single row from the turning means in a first direction to form a first horizontal row including at least one sod piece, translating means for moving said at least one sod piece in the first row in a second horizontal direction at right angle to the first direction to a position to allow a second row to be moved by said conveyor means into a position alongside said at least one sod piece of the first row so as to form said layer having a plurality of said rows arranged side by side with each row having the same number of sod pieces therein and support means for supporting the layer;
and lifting means for lifting the sod pieces of the rows of the layer from the support means simultaneously, for translating the sod pieces from the support means laterally and for depositing the sod pieces in the layer onto the pallet.

2. The machine according to claim 1 wherein the lifting means includes means for grasping each sod piece from an upper surface of the sod piece.

3. The machine according to claim 2 wherein the grasping means comprises a plurality of screw elements each rotatable so as to engage through the upper surface of the sod piece to grasp the body of the sod piece to lift the sod piece vertically.

4. The machine according to claim 2 wherein the grasping means is arranged in an array on a substantially horizontal support member such that each sod piece of the row is grasped by a plurality of the grasping means.

5. The machine according to claim 2 wherein each grasping means comprises a screw element rotatable about a vertical axis so that the screw element is driven through the surface of the sod piece into the body of the sod piece and means surrounding the screw element for engaging the sod piece so as to compress the sod piece around the screw element as the screw element enters through the upper surface of the sod piece.

6. The machine according to claim 4 including drive means arranged to drive simultaneously all of the grasping means for engagement into the respective sod pieces.

7. The machine according to claim 1 wherein said translating means comprises a plurality of chains each formed as an endless loop wrapped around a pair of sprockets for movement of an upper run of each chain in said second direction so that each sod piece is carried upon the chain for movement therewith.

8. The machine according to claim 7 including means for lifting each chain so that the upper run of each chain is movable from a lower retracted position to an upper engaging position for engaging and moving the sod piece.

9. The machine according to claim 1 wherein the conveyor means comprises a plurality of first conveyor belt elements arranged end to end, each spaced from a next adjacent first conveyor belt element such that the sod pieces are carried from each element to the next adjacent element so as to lie across the elements transversely to the direction of movement of the first conveyor belt elements and wherein the translating means comprises a plurality of second conveyor elements each arranged between one of the first conveyor belt elements and a next adjacent one of the first conveyor belt elements and arranged to move at right angles to the direction of movement of the first conveyor belt elements so as to carry the sod piece in said second direction.

10. The machine according to claim 1 wherein the conveyor means comprises a plurality of first receptacles each for receiving a rolled sod piece, each receptacle having a part cylindrical wall with a longitudinal axis of the part cylindrical wall lying transverse to said first direction, the receptacles being arranged side by side with the axes thereof being parallel to each other.

11. The machine according to claim 10 including a plurality of fixed receptacles arranged alongside the conveyor means, each fixed receptacle having a part cylindrical surface for receiving a rolled sod piece therein and wherein there is provided means for pushing the rolled sod pieces simultaneously from a plurality of the receptacles of the conveyor means into respective ones of the fixed receptacles.

12. The machine according to claim 11 wherein each fixed receptacle includes a conveyor means at a bottom surface thereof arranged to assist longitudinal movement of the sod piece therealong.

13. The machine according to claim 1 including means for translating and rotating said lifting means for deposit of said row in a first orientation and for deposit of a subsequent row in a second orientation rotated generally ninety degrees with respect to the first orientation.

14. The machine according to claim 13 wherein said lifting means includes a boom, a carriage movable along the boom, the carriage including means for vertical movement of a vertical support arm and means for rotating said vertical support arm, said vertical support arm including a substantially horizontal lifting support, said lifting support including a plurality of separate lifting elements for engaging said sod pieces.

15. The machine according to claim 1 wherein the pallet support is arranged to maintain the pallet at a constant height during stacking with the layers and wherein the lifting means is arranged to lower each layer in turn to a height dependent upon the height of the next preceding layer deposited on the pallet.

16. A sod harvesting and stacking machine comprising a vehicle frame having ground wheels for movement across ground to be harvested of sod;

a sod cutting element mounted on the vehicle frame for movement therewith and arranged to cut from the ground only a single width of sod of substantially continuous length;

sod transporting means for moving the single width of sod upwardly with respect to the ground and rearwardly of the vehicle frame;

cutting means for cutting the sod width transversely at spaced positions longitudinally of the harvested sod length into a plurality of sod pieces arranged end to end;

turning means for turning one end of each sod piece back over onto a part of the same sod piece to form a so piece having at lest two superposed portions;

a pallet support for supporting a pallet for receiving the sod pieces stacked thereon in a plurality of layers each layer being placed on top of a preceding layer;

means for forming the sod pieces into a layer for transfer to the pallet including conveyor means having a horizontal portion for transporting sod pieces in a single row from the turning means in a first direction to form a first horizontal row including at least one sod piece, translating means for moving said at least one sod piece in the first row in a second horizontal direction at right angles to the first direction to a position to allow a second row to be moved by said conveyor means into a position alongside so at least one sod piece of the first row so as to form said layer having a plurality of said rows arranged side by side with each row having the same number of sod pieces therein and support means for supporting the layer;

and lifting means for lifting the sod pieces of the rows of the layer from the support means simultaneously, for translating the sod pieces from the support means laterally and for depositing the sod pieces in the layer onto the pallet;

wherein said translating means comprises a plurality of chains each formed as an endless loop wrapped around a pair of sprockets for movement of an upper run of each chain in said second direction so that each sod piece is carried upon the chain for movement therewith, and means for lifting each chain so that the upper run of each chain is movable from a lower retracted position to an upper engaging position for engaging and moving the sod pieces.

17. A sod harvesting and stacking machine comprising a vehicle frame having ground wheels for movement across ground to be harvested of sod;

a sod cutting element mounted on the vehicle frame for movement therewith and arranged to cut from the ground only a single width of sod of substantially continuous length;

sod transporting means for moving the single width of sod upwardly with respect to the ground and rearwardly of the vehicle frame;

cutting means for cutting the sod width transversely at spaced positions longitudinally of the harvested sod length into a plurality of sod pieces arranged end to end;

turning means for turning one end of each sod piece back over onto a part of the same sod piece to form a sod piece having at least two superposed portions;

a pallet support for supporting a pallet for receiving the sod pieces stacked thereon in a plurality of layers each layer being placed on top of a preceding layer;

means for forming the sod pieces into a layer for transfer to the pallet including conveyor means having a horizontal portion for transporting sod pieces in a single row from the turning means in a first direction to form a first horizontal row including at least on sod piece, translating means for moving said at least one sod piece i the first row in a second horizontal direction at right angles to the first direction to a position to allow a second row to be moved by said conveyor means into a position alongside said at least one sod piece of the first row so as to form said layer having a plurality of said rows arranged side by side with each row having the same number of sod pieces therein and support means for supporting the layer;

and lifting means for lifting the sod pieces of the rows of the layer from the support means simultaneously, for translating the sod pieces from the support means laterally and for depositing the sod pieces in the layer onto the pallet;

wherein the conveyor means comprises a plurality of first conveyor belt elements arranged end to end, each spaced from a next adjacent first conveyor belt element such that the sod pieces are carried from each element to the next adjacent element so as to lie across the elements transversely to the direction of movement of the first conveyor belt elements and wherein the translating means comprises a plurality of second conveyor elements each arranged between one of the first conveyor belt elements and a next adjacent one of the first conveyor belt elements and arranged to move at right angles to the direction of movement of the first conveyor belt elements so as to carry the sod piece in said second direction.

18. A sod harvesting and stacking machine comprising a vehicle frame having ground wheels for movement across ground to be harvested of sod;

a sod cutting element mounted on the vehicle frame for movement therewith and arranged to cut from the ground only a single width of sod of substantially continuous length;

sod transporting means for moving the single width of sod upwardly with respect to the ground and rearwardly of the vehicle frame;

cutting means for cutting the sod width transversely at spaced positions longitudinally of the harvested sod length into a plurality of sod pieces arranged end to end;

turning means for turning one end of each sod pieced back over onto a part of the same sod piece to form a sod piece having at least two superposed portions;

a pallet support for supporting a pallet for receiving the sod pieces stacked thereon in a plurality of layers each layer being placed on top of a preceding layer;

means for forming the sod pieces into a layer for transfer to the pallet including conveyor means having a horizontal portion for transporting sod pieces in a single row from the turning means in a first direction to form a first horizontal row including at least one sod piece, translating means for moving said at least one sod piece in the first row in a second horizontal direction at right angles to the first direction to a position to allow a second row to be moved by said conveyor means into a position alongside said at least one sod piece of the first row so as to form said layer having a plurality of said rows arranged side by side with each row having the same number of sod pieces therein and support means for supporting the layer;

and lifting means for lifting the sod pieces of the rows of the layer from the support means simultaneously, for translating the sod pieces from the support means laterally and for depositing the sod pieces in the layer onto the pallet;

wherein said conveyor means comprises a plurality of first receptacles each for receiving a rolled sod piece, each receptacle having a part cylindrical wall with a longitudinal axis of the part cylindrical wall lying transverse to said first direction, the receptacles being arranged side by side with the axes thereof being parallel to each other.

19. The machine according to claim 18 including a plurality of fixed receptacles arranged alongside the conveyor means, each fixed receptacle having a part cylindrical surface for receiving a rolled sod piece therein and wherein there is provided means for pushing the rolled sod pieces simultaneously from a plurality of the receptacles of the conveyor means into respective ones of the fixed receptacles.

20. The machine according to claim 19 wherein each fixed receptacle includes conveyor means at a bottom surface thereof arranged to assist longitudinal movement of the sod piece therealong.

* * * * *